United States Patent [19]

Goscenski, Jr.

[11] 4,238,013
[45] Dec. 9, 1980

[54] CONTACT IMPROVER FOR CLUTCH OF A SLIP LIMITING DIFFERENTIAL

[75] Inventor: Edward J. Goscenski, Jr., Battle Creek, Mich.

[73] Assignee: Eaton Corporation, Cleveland, Ohio

[21] Appl. No.: 904,076

[22] Filed: May 8, 1978

[51] Int. Cl.³ .................. F16D 13/60; F16H 1/38
[52] U.S. Cl. ................................ 192/54; 74/711; 192/70.14; 192/107 R
[58] Field of Search .......... 192/70.14, 107 R, 70.12, 192/54, 113 B; 74/711; 188/250 G, 73.1, 73.2

[56] References Cited

U.S. PATENT DOCUMENTS

| | | | |
|---|---|---|---|
| Re. 28,004 | 5/1974 | Ottemann | 74/711 |
| 2,144,223 | 1/1939 | Klocke | 192/107 R |
| 2,674,359 | 4/1954 | Du Rostu | 192/107 R X |
| 3,052,137 | 9/1962 | Russell | 74/710.5 |
| 3,073,424 | 1/1963 | Russell | 192/113 |
| 3,648,545 | 3/1972 | Clancey | 74/710.5 |
| 3,831,462 | 8/1974 | Baremor | 74/711 |

FOREIGN PATENT DOCUMENTS

557569  11/1943  United Kingdom ................. 192/70.14

Primary Examiner—Rodney H. Bonck
Attorney, Agent, or Firm—R. J. McCloskey; J. Yakimow

[57] ABSTRACT

For use with a differential, annular friction discs configured to insure mating frictional contact between adjacent discs along a desired line of contact. The discs are selectively connected to either a side gear or the housing of the differential. At least one of the friction discs contain a relatively flat annular surface which is located on the opposite side of another surface having a pair of radially spaced annular projections for engagement with a relatively flat annular surface of an adjacent disc. At least one other friction disc has a relatively flat annular surface with an opposed surface having an annular projection spaced radially intermediate the radial space projection on the previously mentioned disc. The single annular projection is for engagement with a relatively flat surface of an adjacent friction disc. The discs are located between the side gear and the housing of a differential. In response to axial movement between the side gear and housing, the adjacent surfaces of the discs move into frictional contact with one another to retard relative movement between the side gear and housing. In this manner, the differential retards relative rotation between the side gears of the differential. The given configuration of the discs insure proper engagement between the mating relatively flat surfaces of the discs.

17 Claims, 13 Drawing Figures

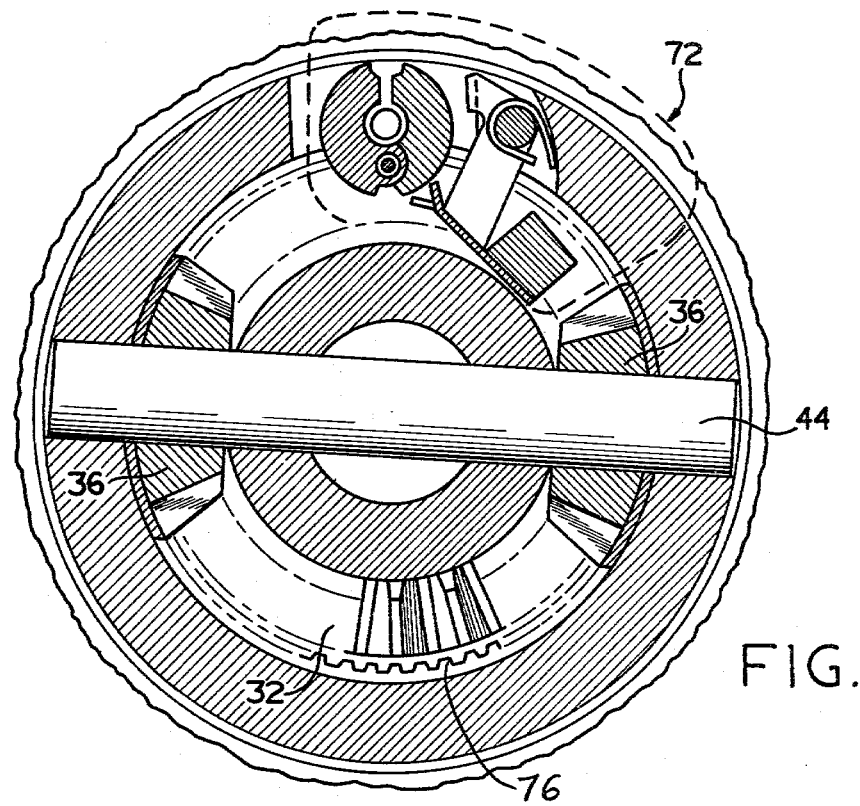
FIG. 2
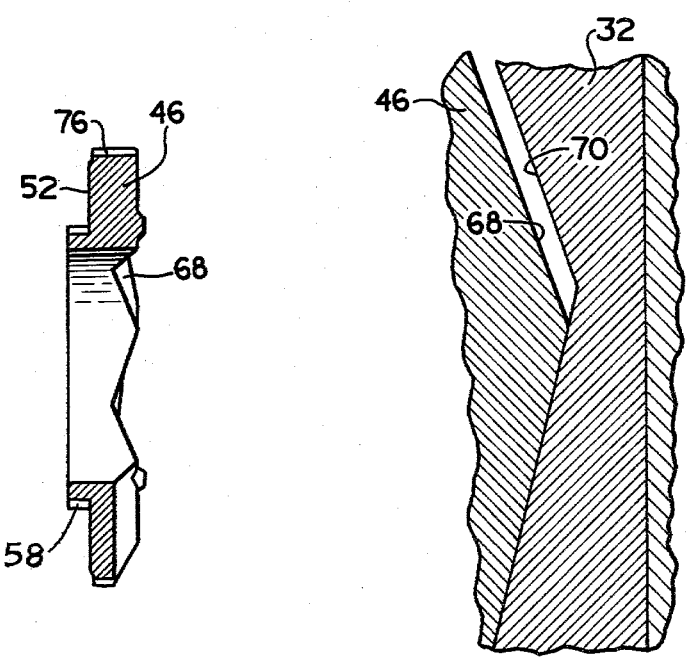
FIG. 5
FIG. 6

CONTACT IMPROVER FOR CLUTCH OF A SLIP LIMITING DIFFERENTIAL

BACKGROUND OF THE DISCLOSURE

The application is directed toward a clutch disc contact improver for a differential.

The locking differential illustrated and claimed in U.S. Pat. No. Re. 28,004 has achieved significant commercial success. This differential retards relative rotation between the driven axles only when one axle achieves a rotational characteristic which exceeds the rotational characteristic of the other axle. This differs significantly from limited slip differentials wherein force is transmitted between the two axles constantly during all modes of operation. In both the locking differential and the limited slip differential, a plurality of clutch discs are employed to retard rotation between the axles during actuation of the respective differential. Although these clutch discs are manufactured in a manner entirely acceptable for operation of the respective differentials, applicant has determined that the close tolerances needed to achieve such satisfactory results can be loosened. It is to this concept which the following invention is directed.

Generally, the invention covers a novel design of a clutch for use in either a limited slip differential or a locking differential wherein the clutch includes a plurality of discs with an annular central protrusion on a preferred contact circle of one of the surfaces to contact an adjacent flat surface and a pair of radially spaced annular protrusions on another surface to contact an adjacent flat surface. The surfaces containing the protrusions may be on the discs or portions of the differential. If the protrusions are on the discs, the protrusions may be located either on the same disc, on adjacent discs, or on spaced discs. It is only necessary that the given protrusions be so situated that they contact a given surface or protrusions on an adjacent disc. The plate thickness of the discs must be such that they be at least capable of acting as a Belleville washer with a very low rate while the sections must be sufficiently adequate to transmit the required forces without excessive deformation. Rigid discs may also be used.

BRIEF DESCRIPTION OF THE DRAWINGS

FIG. 2 is a sectional view taken substantially along line 2—2 of FIG. 1.

FIG. 5 is a sectional view taken along line 5—5 of FIG. 4.

FIG. 6 is an enlarged partial view illustrating contact between wedge surfaces of the cam and side gear.

DESCRIPTION OF THE PREFERRED EMBODIMENT

Figure 1:
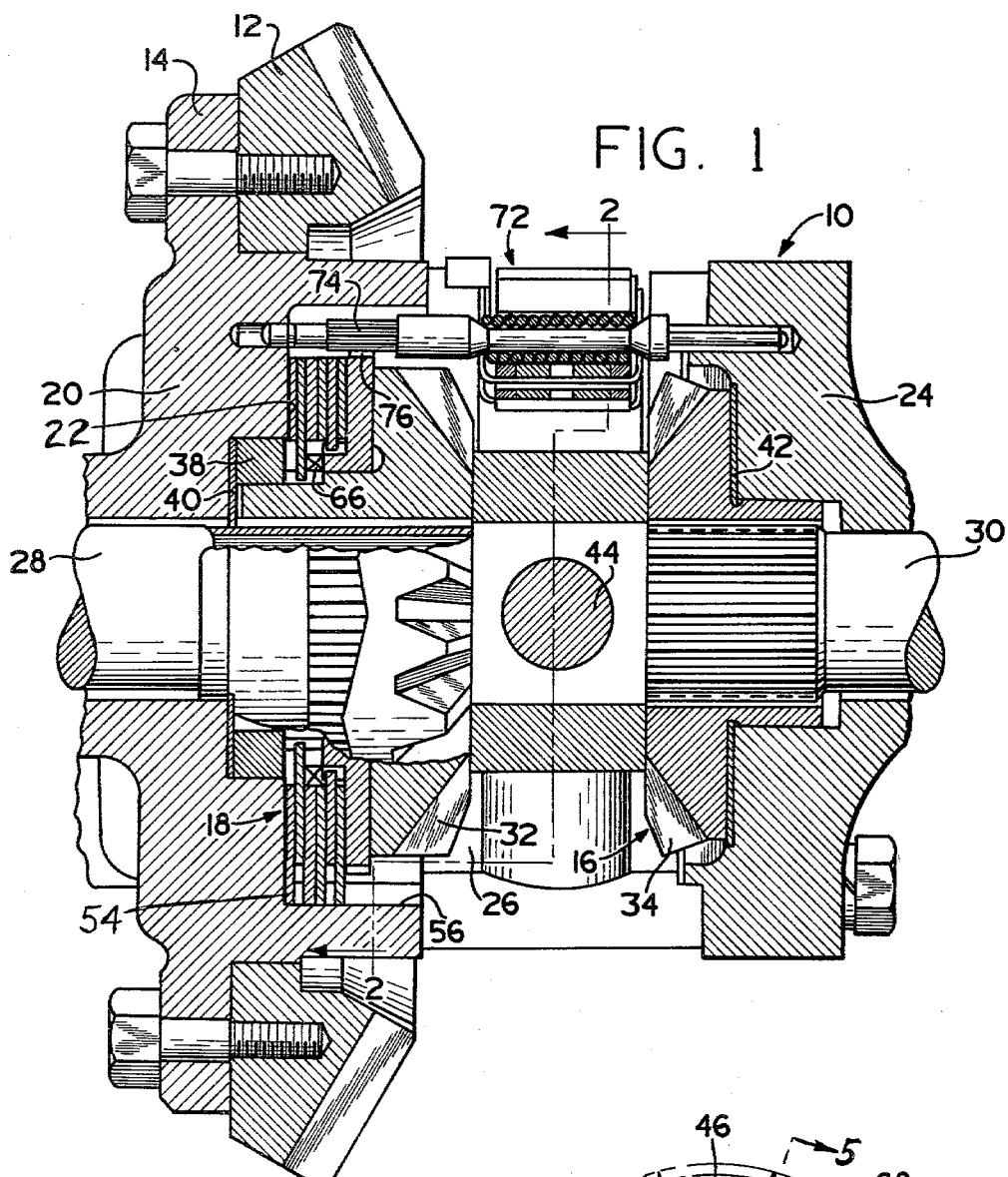
FIG. 1 is a plan view in partial section of a locking differential.
Figure 3:
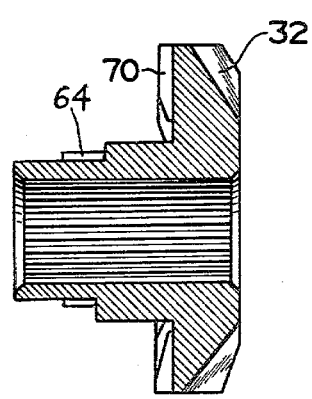
FIG. 3 is a sectional view of a side gear illustrated in FIG. 1.
Figure 4:
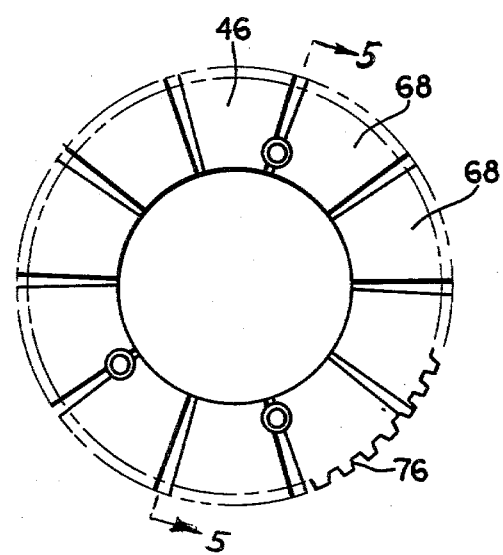
FIG. 4 is a plan view of the cam member of FIG. 1 illustrating the surface which cooperates with the wedge surface on the side gear of FIG. 3.

Gear differential mechanism 10 is of a type more fully described in U.S. Pat. No. 3,831,462, issued to Jerry F. Baremor. The specification of that patent is hereby incorporated by reference into this application.

For the present, it is sufficient to state that mechanism 10 includes an input ring gear 12 secured to a rotatable casing 14, a differential gear train 16 and a regenerative self energizing clutch assembly 18. Casing 14 includes a pair of support portions adapted to be received for rotation in the bearings of an axle housing, not shown. The casing further includes a wall 20 defining an annular thrust surface 22 and another wall 24. Walls 20 and 24 define a chamber 26 for gear train 16 and clutch 18.

Gear train 16 is operable to transmit rotary motion from casing 14 to a pair of output shafts 28 and 30. To accomplish this purpose, the gear train includes a pair of beveled side gears 32 and 34 and beveled pinion planetary gears 36 (FIG. 2) disposed between and in meshing engagement with the side gears. The side gears are retained against outward movement by a thrust sleeve 38 and thrust washers 40 and 42. Pinion gears 36 are rotatably supported by casing 14 by means of a pinion shaft 44 extending across the gear chamber.

Self energizing clutch 18 is of the friction disc type and is operable between a disengaged condition wherein the axle shafts 28 and 30 are freely rotatable relative to each other and an engaged condition wherein the clutch 18 drivingly interconnects the axle shafts through casing 14 and gears 32, 34, and 36 to retard relative rotation therebetween. Clutch 18 includes two separate and distinct clutching portions. One portion is "active" to provide regenerative self engaging force for fully actuating the clutch mechanism while the other portion is "inactive" and merely increases total torque capacity after actuation.

Figure 7:
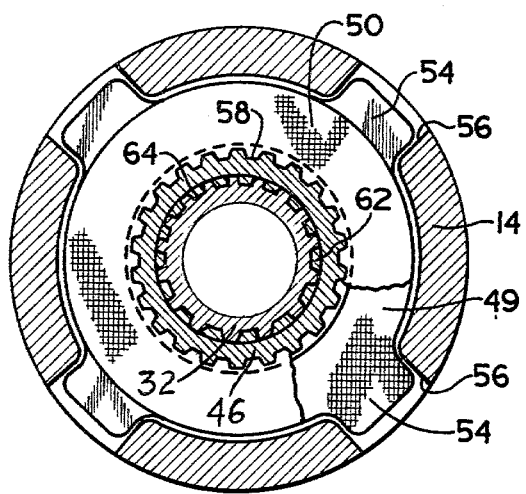
FIG. 7 is a sectional view of the clutch of FIG. 1 taken substantially along line 7—7 of FIG. 8.

The "active" portion (FIGS. 1 and 8) of clutch 18 includes a cam 46 and interleaved clutch discs 48, 49 and 50. Cam 46 includes an annular thrust surface 52. For purposes of this disclosure, the cam will be considered as part of side gear 32. Clutch disc 48 and 49 are mounted for positive rotation with casing 14 by means of tabs 54 received in recesses 56 of casing 14 (FIG. 7). This particular mounting arrangement is more clearly shown in U.S. Pat. No. 3,052,137, issued to Robert C. Russell. Clutch disc 50 is mounted for positive rotation with cam 46 by means of a spline engagement 58. The "inactive" portion (FIGS. 1 and 8) of clutch 18 is provided to give increased torque transmitting capacity to the clutch and includes a plurality of alternately interleaved discs 60, 61, and 62. Discs 60 and 61 are generally identical in structure and mounting arrangement to the disc 48 of the "active" portion and are likewise configured for positive rotation with casing 14. Disc 62 is mounted for positive rotation with side gear 32 by means of a spline engagement 64. In order to provide for smooth engagement of clutch 18, the number of "active" discs is preferably greater than two and less than ten as more fully discussed in U.S. Pat. No. 3,831,462. When clutch 18 is in the disengaged condition (FIG. 8), the friction surfaces of discs 48, 50, 49, 60, 61, and 62 do not prevent relative rotation of axle shafts 28 and 30. This enables casing 14 to be rotated relative to the side gears. A wave spring 66 is provided to insure such disengagement by forcing disc 62 into contact with disc 60 and surfaces 22 and 52 away from one another.

Cam 46 is drivingly connected to side gear 32 by wedging ramp surfaces 68 and 70 formed on the cam and the side gear respectively (FIGS. 3 to 6). These surfaces 68 and 70 serve to move the friction discs 48, 50, 49, 60, 61, and 62 into engagement when relative rotational movement between the side gears and the casing is induced. When the friction discs are in a fully engaged position (FIG. 1), relative rotation is prevented by static friction forces acting between abutting face surfaces on the discs and abutting surfaces on disc 48 and cam 46.

An actuator 72 having a splined shaft 74 drivingly engaged in gear teeth 76 of cam 46 is mounted for rotation with casing 14. The actuator is of a type more fully described in U.S. Pat. No. Re 28,004, issued to William C. Otteman. The specification of that patent is hereby incorporated by reference into this application. For the present, it is sufficient to state that when a predetermined rate of slip occurs between casing 14 and the side gears, actuator 72 is operable to retard cam 46 slightly relative to side gear 32 thereby initiating actuation of clutch pack 18.

Actuator 72 thus provides an initial actuating force which, although relatively small, is sufficient to retard movement of cam 46 relative to side gear 32 by virtue of the drive connection of the gear teeth 76 and the spline on shaft 74. The abutting engagement of the sloping portions of the cam surface 68 against similarly sloping portions of the surface 70 of side gear 32 causes an axially directed force to be applied against cam 46 thus reducing the distance between thrust surfaces 22 and 52 and causing frictional engagement of the discs. Since the initial actuating force provided by actuator 72 is insufficient by itself to effect operation of clutch 18, the self energizing characteristic of clutch 18 is necessary to complete the lock-up of side gear 32 relative to casing 14.

The friction discs preferably have a characterized surface capable of developing a dynamic coefficient of friction to achieve smooth locking action. One method of making such surfaces is illustrated in U.S. Pat. No. 3,073,424, issued to Robert C. Russell. The specification of that patent is hereby incorporated by reference into this application. For purposes of this application, it is sufficient to say that the frictional contact surfaces have a checker board configuration with the squares of the checker board being high spots and the lines of the checker board being grooves.

For differentials for use in a ½ ton pickup truck manufactured in the United States, satisfactory results in the locking characteristics may be achieved by use of 3 "active" and 6 "inactive" discs having an effective clutch diameter of approximately 3.00 inches (7.6 cm) and an effective cam angle of approximately 12.5 degrees.

Figure 8:
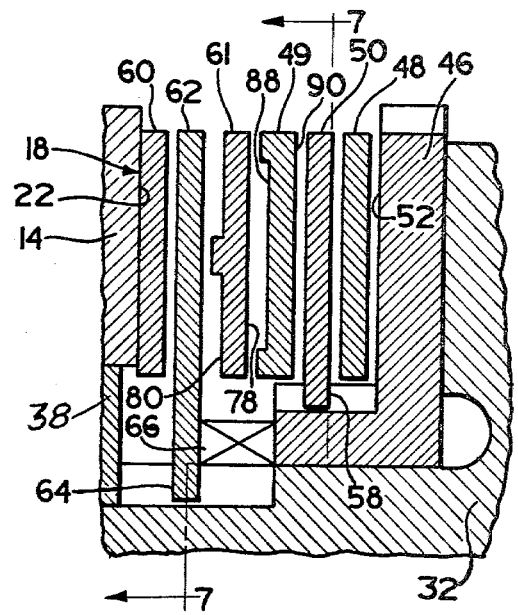
FIG. 8 is a fragmentary enlarged view of the clutch of FIG. 1.

Applicant has determined that by holding the faces of friction discs 48, 50, 49, 60, 61, and 62 along with thrust surfaces 22 and 52 parallel within several ten thousands of an inch, there are no problems with disc contact. In such cases, pressure across the friction discs will balance out and smooth and complete locking can be accomplished. However, if such dimensions cannot be maintained, it has been determined by applicant that satisfactory disc contact can be accomplished in yet another manner. In the embodiment of FIG. 8 the discs 49 and 61 are connected by tabs 54 to casing 14. Discs 49 and 61 are so constructed that they will not bow along the radially extending plane. For this purpose, preferably, the thickness of the discs should be in the neighborhood of seventy thousands of an inch.

Figure 9:
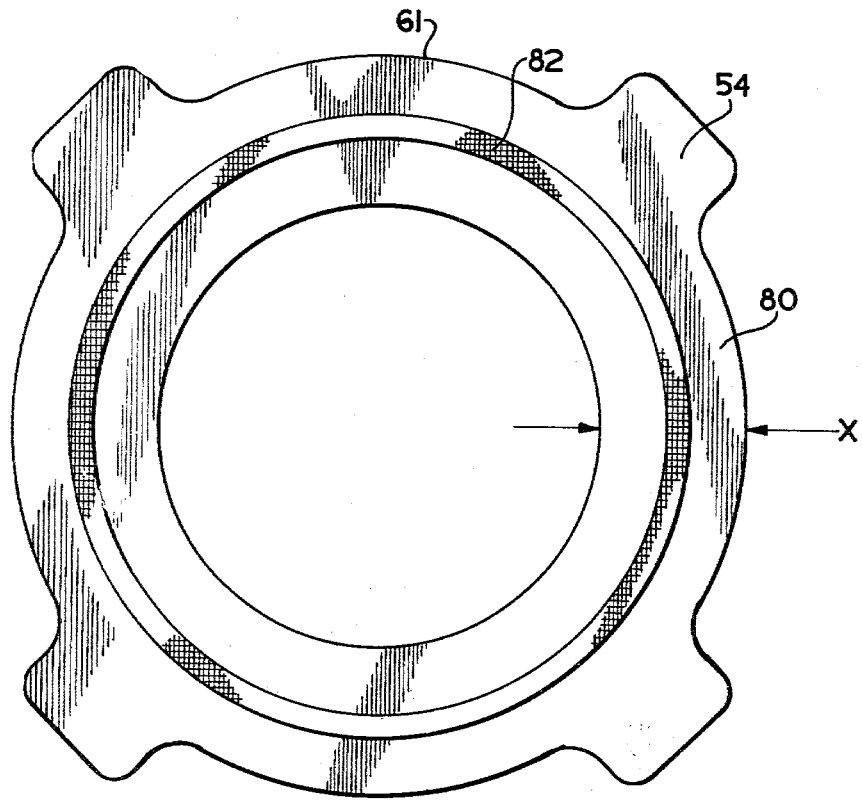
FIG. 9 is an enlarged plan view of a disc according to the invention.
Figure 10:
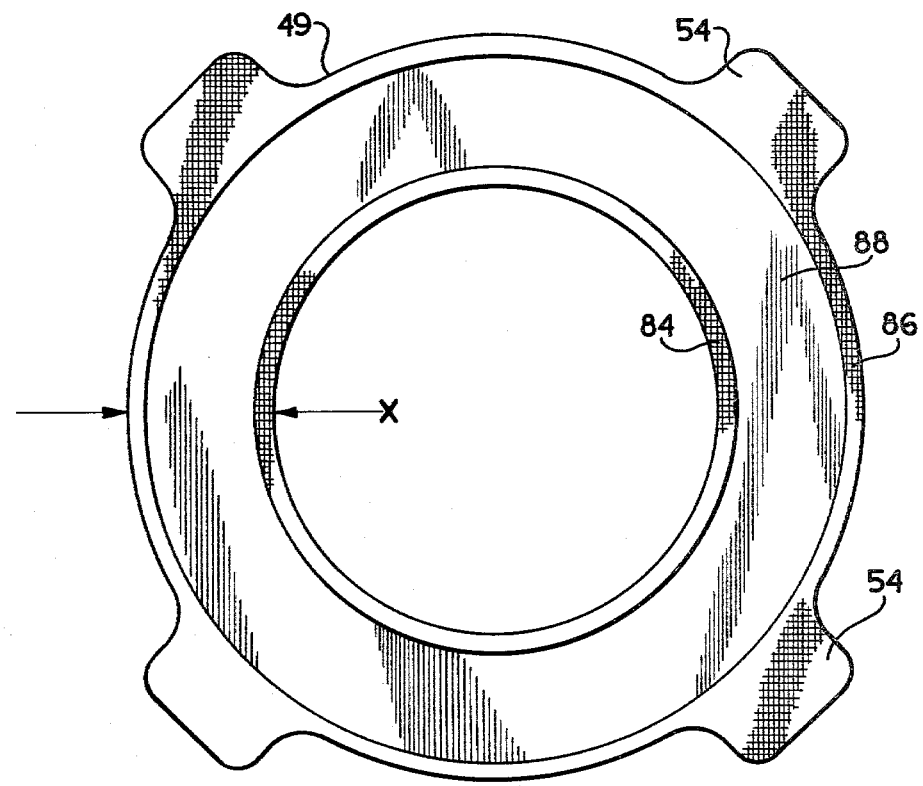
FIG. 10 is an enlarged plan view of a disc according to the invention.

As best illustrated in FIG. 9, disc 61 has a given radial thickness X and a pair of opposed annular surfaces 78 and 80 (FIG. 8). On annular surface 80, there is provided a center annular contact portion 82 protruding from the annular surface. Center contact portion is located along a desired circle of contact of friction disc 61. In the illustrated arrangement, the circle of contact would be at the approximate center of annular surface 80. Friction disc 49 (FIG. 10), on the other hand, contains a pair of annular contact portions 84 and 86 protruding away from annular surface 88. The pair of annular contact portions on disc 49 are spaced radially on each side of center portion 82 as illustrated in FIG. 8. The opposite annular side 90 of disc 49 and surface 78 are substantially parallel to thrust surfaces 22 and 52 as illustrated in FIG. 8. Portions 82, 84, and 86 need not contain the checker board configuration previously referenced.

It should be sufficient to state at this point that the clutch illustrated in FIG. 8 may be constructed to contain only one center annular contact portion and one friction disc. Further, center annular contact portion 82 can be located on the surfaces 22 or 52 instead of on the remaining disc. As a practical matter, at least discs 48 and 50 should be used in the differential.

If desired, the center annular contact portion 82 can be located on one side of a disc while the pair of annular contact portions 84 and 86 can be located on the opposite side of the same disc.

Further, in the preferred embodiments, the discs are illustrated and described as having relatively parallel surfaces. It is contemplated that instead of providing parallel surfaces, relatively flat surfaces can also be provided such as exist on the opposite sides of a Belleville washer. It is only necessary, in providing the discs, that the discs be free to bend along their diameter but not bow along the radial dimension X. Accordingly, if discs having the general configuration of a Belleville washer were used, upon decrease of the axial distance between thrust surfaces 22 and 52 the opposed flat surfaces would make contact with one another to provide the frictional engagement. The foregoing is provided to more clearly illustrate the scope of the invention as set forth in the appended claims.

Figure 11:
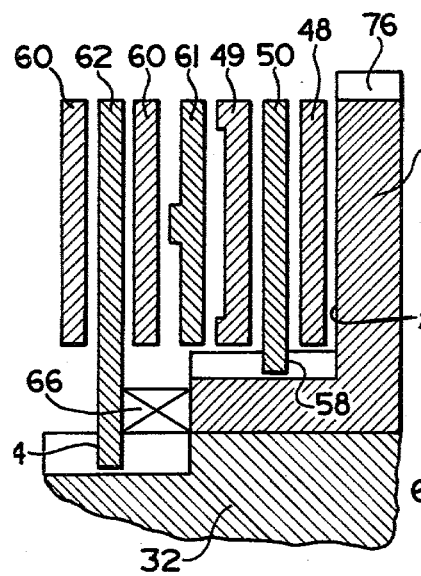
FIGS. 11, 12, and 13 are alternate embodiments of the invention and illustrate the clutch in a manner similar to that in FIG. 8.
Figure 12:
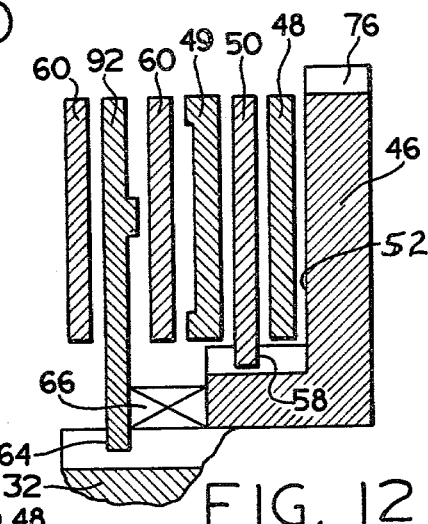
Figure 13:
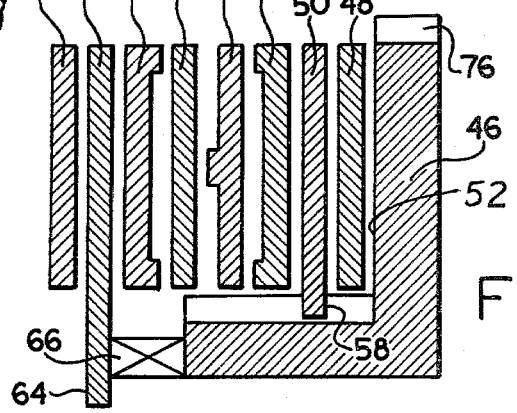

FIGS. 11, 12, and 13 illustrate other embodiments of the invention within the scope of the claims. Disc 92 in FIG. 12 is similar to disc 61 is operation but is in splined engagement at 64 to gear 32 in a manner similar to disc 62 in FIG. 8. From FIG. 12, it can be seen that the contact portions 82 and 84 and 86 can be on a disc either connected to casing 14 or gear 32. Applicant has achieved the best results with the arrangement illustrated in FIG. 13. If desired, the contact portions could be formed by separate rings located between adjacent surfaces to exert force. These rings would be associated with a surface for exerting the force on an adjacent surface.

It is also contemplated that two discs 49 may be located in a clutch in manner that contact portions 84 and 86 would be aligned for contact with one another. This may be illustrated within the FIG. 13 embodiment by moving discs 60 and 61 intermediate discs 49 and 62. Likewise, contact portions 82 on two discs 61 could similarly be aligned for contact with one another. These latter two arrangements find particular utility where the contact portions 84 and 88 appear on one side of a disc and the contact portion 82 appears on the other side of the same disc with corresponding contact portions, e.g. protrusions 82, of adjacent discs aligned for contact with one another.

Further, although the disclosure is described with reference to a gear differential, it should be noted that the clutch actually prevents relative rotation between two rotatable objects. As illustrated in FIG. 1 relative rotation is prevented between casing 14 and side gear 32. If desired, the casing 14 could have rotated a shaft about an axis while side gear 32 rotated another shaft about the same axis. Further, side gear 34 and gears 36 could have been eliminated, with appropriate modification to the unit, and shaft 28 used as an input member to rotated casing 14 when clutch 18 was actuated.

What is claimed is:

1. A clutch for retarding relative rotation between two rotatably members, said clutch comprising: a first annular thrust surface rotatable with one of said members; a second annular thrust surface rotatable with the other of said members and in substantially opposed relation to said first thrust surface; at least one disc interposed between said thrust surfaces, said disc having opposed annular contact surfaces having a given radial dimension and configured to be aligned relative to said thrust surfaces; means to reduce the distance between said thrust surfaces to move adjacent surfaces toward one another; first means associated with one of said surfaces for exerting a force on an adjacent surface along a desired circle of contact within said boundries of said annular thrust surfaces, said first means being the only force exerting means associated with said one surface; second means associated with another surface different from said one surface and said respective adjacent surface upon which said first means exerts a force to exert a force on an adjacent surface along a desired circle of contact radially outwardly from said first means within said boundries of said annular thrust surfaces; and third means associated with said another surface different from said one surface and said respective adjacent surface upon which said first means exerts a force to exert a force on said an adjacent surface along a desired circle of contact radially inwardly from said first means within said boundries of said annular thrust surfaces, said second and third means being the only force exerting means that may be associated with said another surface; whereby movement of said thrust surfaces toward one another will result in said contact.

2. A clutch according to claim 1 wherein said at least one disc is a plurality of discs.

3. A clutch according to claim 1 or 2 wherein said first, second, and third means comprise annular contact portions protruding away from surfaces on discs.

4. A clutch according to claim 3 wherein said adjacent surfaces not containing annular contact protrusions are relatively flat.

5. A differential gear mechanism comprising a rotatable casing member having a wall with an annular thrust surface; a gear train having gears rotatable in the casing with the teeth of adjacent gears in meshing engagement, one of the gears having a body member with an annular thrust surface in substantially opposed relation to the thrust surface of the casing member; means to reduce the distance between the thrust surfaces; and a disc interposed between said thrust surfaces; said disc having opposed annular contact surfaces having a given radial dimension and configured to be aligned relative to said thrust surfaces, one of said four surfaces being relatively flat and another of said four surfaces having only a center annular contact surface portion protruding away from said other surface toward one of said thrust surfaces for engagement with said relatively flat surface, said center portion being located on a desired circle of contact between said members whereby movement of said thrust surfaces toward one another will result in contact between said respective surfaces.

6. A mechanism according to claim 5 wherein three of said surfaces are relatively flat.

7. A mechanism according to claim 5 further comprising: an additional disc attached to one of said members and interposed between said thrust surfaces and having opposed annular contact surfaces having a given radial dimension and configured to be aligned with said first surfaces; and wherein at least two surfaces are relatively flat and yet another surface has only a pair of annular contact side surface portions protruding away from said yet another surface toward the other of said thrust surfaces for engagement with a relatively flat surface, said annular contact side surface portions being spaced radially on each side of said center annular contact portion.

8. A mechanism according to claim 7 further comprising: another additional disc attached to one of said members and interposed between said thrust surfaces and having opposed annular contact surfaces having a given radial dimension and configured to be aligned with said thrust surfaces; and wherein said contact surfaces of said another additional disc are relatively flat.

9. A mechanism according to claim 7 further comprising a plurality of discs interposed between said thrust surfaces and having opposed annular contact surfaces having a given radial dimension and configured to be aligned with said thrust surfaces; and wherein said contact surfaces of said plurality of discs are relatively flat.

10. A mechanism according to claim 9 wherein: said annular contact side surface portions are located on one disc; said center annular contact surface portion is located on an adjacent disc; and the relatively flat surfaces of said disc containing said portions are adjacent one another.

11. A mechanism according to claim 10 wherein said discs containing said surface portions are respectively attached to said one member and said other member.

12. A mechanism according to claim 10 wherein said discs containing said surface portions are attached to the same member.

13. A mechanism according to claim 9 wherein said plurality of discs are selectively attached to said members.

14. A mechanism according to claim 7 further comprising: two additional discs interposed between said thrust surfaces and each having opposed annular contact surfaces having a given radial dimension and configured to be aligned with said thrust surfaces; and wherein the contact surfaces of one of said two additional discs are relatively flat; the other of said two additional discs has a relatively flat contact surface and an opposed contact surface having only a pair of annular contact side surface portions protruding away from said opposed contact surface toward said one thrust surface for engagement with yet another of said parallel surfaces, said annular contact side surface portions being spaced radially on each side of said center annular contact surface portion; and said surfaces are aligned thrust surface, flat surface, contact portion, flat surface, flat surface, contact portion, flat surface, contact portion, flat surface and thrust surface.

15. A mechanism according to claim 14 wherein all of said discs are attached to the same member.

16. A mechanism according to claim 15 further comprising additional disc similar to said one of said two additional discs and selectively attached to one of said members.

17. A mechanism according to claim 1, 2, 9, 10, 11, or 16 wherein each of said discs may bend along their diameter but not bow along their radial dimension.

* * * * *